US007024544B2

(12) United States Patent
Shelor

(10) Patent No.: US 7,024,544 B2
(45) Date of Patent: Apr. 4, 2006

(54) APPARATUS AND METHOD FOR ACCESSING REGISTERS IN A PROCESSOR

(75) Inventor: Charles F. Shelor, Arlington, TX (US)

(73) Assignee: VIA-Cyrix, Inc., Fremont, CA (US)

( * ) Notice: Subject to any disclaimer, the term of this patent is extended or adjusted under 35 U.S.C. 154(b) by 472 days.

(21) Appl. No.: 10/602,813

(22) Filed: Jun. 24, 2003

(65) Prior Publication Data

US 2004/0268089 A1 Dec. 30, 2004

(51) Int. Cl.
*G06F 9/34* (2006.01)

(52) U.S. Cl. ........................ 712/229; 711/202; 711/220

(58) Field of Classification Search ............... 712/43, 712/229; 711/202, 220
See application file for complete search history.

(56) References Cited

U.S. PATENT DOCUMENTS

| | | | | |
|---|---|---|---|---|
| 5,210,836 | A | 5/1993 | Childers et al. ............. | 395/375 |
| 5,784,076 | A | 7/1998 | Crump et al. ................ | 345/519 |
| 5,860,107 | A | 1/1999 | Patel ........................... | 711/140 |
| 6,216,223 | B1 | 4/2001 | Revilla et al. ............... | 712/245 |
| 6,249,856 | B1 | 6/2001 | Garg et al. .................... | 712/23 |
| 6,282,634 | B1 * | 8/2001 | Hinds et al. ................. | 712/210 |
| 6,347,354 | B1 * | 2/2002 | Abhyankar et al. ............. | 711/5 |
| 6,351,803 | B1 | 2/2002 | Peng et al. ................... | 712/216 |
| 6,357,016 | B1 | 3/2002 | Rodgers et al. .............. | 713/601 |
| 6,397,324 | B1 | 5/2002 | Barry et al. ................. | 712/225 |
| 6,408,381 | B1 | 6/2002 | Gearty et al. ................ | 712/225 |
| 6,446,195 | B1 | 9/2002 | Ganapathy et al. .......... | 712/221 |
| 6,519,707 | B1 | 2/2003 | Clark et al. .................. | 713/322 |
| 6,711,170 | B1 * | 3/2004 | Brown ...................... | 370/395.7 |

OTHER PUBLICATIONS

Exploiting Data Forwarding to Reduce the Power Budget of VLIW Embedded Processors Sami et al.
Low-Power Data Forwarding for VLIW Embedded Architectures Sami et al.

* cited by examiner

*Primary Examiner*—William M. Treat
(74) *Attorney, Agent, or Firm*—Thomas, Kayden, Horstemeyer & Risley

(57) ABSTRACT

The present invention is generally directed to an apparatus and method for accessing registers within a processor. In accordance with one embodiment, an apparatus and method are provided for a processor in which at least two separate indicia (such as register select lines, register bank identifiers, processor mode identifiers, etc.) are utilized to uniquely identify and access a processor register. In accordance with this embodiment, bit lines of the separate indicia are encoded into a single, mapped set of signal lines, and these encoded signal lines are used to access the register.

12 Claims, 6 Drawing Sheets

APPARATUS AND METHOD FOR ACCESSING REGISTERS IN A PROCESSOR

FIELD OF THE INVENTION

The present invention generally relates to processors, and more particularly to an apparatus and method for identifying and accessing registers in a processor.

BACKGROUND

Processors (e.g., microprocessors) are well known and used in a wide variety of products and applications, from desktop computers to portable electronic devices, such as cellular phones and PDAs (personal digital assistants). As is known, some processors are extremely powerful (e.g., processors in high-end computer workstations), while other processors have a simpler design, for lower-end, less expensive applications and products.

Further still, most processor architectures are register based. A register-based processor architecture utilizes a set of registers for carrying out various operations. In this regard, data values are moved from memory into registers and operations are performed on registers. For example, the following (commented) sequence of instructions may be performed to add the value of 8 to the contents of the data stored at memory location A238.

LOAD A, 8; (Comment: load register A with the value 8)
LOAD B, [A238]; (Comment: load register B with the data value at address A238)
ADD C, A, B; (Comment: add the contents of registers A and B and store the result in register C The structure and operation of such register-based processors are well known, and need not be described herein.

As is also known, many processor architectures maintain their register base in a location referred to as a register file. Further, many register files contain more individual registers than that which are available at any given time (or to any given instruction). That is, in many processor architectures, only a subset of registers are available (or visible) to any given instruction. This instruction availability may depend on a variety of factors, such as the current mode of operation. Thus, in some processors, individual registers may be identified through a combination of register-select bits and mode-identifying bits.

As is known, many processors have pipelined architectures to increase instruction throughput. In theory, scalar pipelined processors can execute one instruction per machine cycle (and more in super-scalar architectures) when executing a well-ordered, sequential instruction stream. This is accomplished even though an instruction itself may implicate or require a number of separate micro-instructions to be effectuated. Pipelined processors operate by breaking up the execution of an instruction into several stages that each require one machine cycle to complete. For example, in a typical system, an instruction could require many machine cycles to complete (fetch, decode, ALU operations, etc.).

Reference is made to FIG. 1, which is a block diagram illustrating the organization and flow of information in a pipelined processor capable of operating in a plurality of operating modes. In the pipelined architecture of FIG. 1, there is illustrated a decode stage 10, a read stage 20, an execute stage 30, a memory access stage 40, a retire stage 50, and a register write stage 60. The structure and operation of these various pipeline stages are known and understood by persons skilled in the art, and therefore need not be described herein. As is known, in the decode stage 10, circuitry from a decoder or decode logic decodes an encoded instruction and generates control signals for the circuitry of the processor to execute (or carry out) the decoded instruction. In the illustrated figure, there are six sets of signal lines 11 illustrated as passing from the decode stage 10 to downstream stages. Each group of signal lines uniquely identifies a register of the processor. As is known, although not specifically illustrated in FIG. 1, a processor includes a plurality of registers into which data from memory may be imported (or into which calculated data or results may be written). Frequently, a processor contains a number of physical registers, with only a subset of the registers accessible at any given time. In this regard, registers may be banked, such that registers from a given bank are available at a particular time. Alternatively, processors may be configured to operate in a plurality of modes, such that only a subset of the physical registers are available during a particular mode of operation.

As illustrated in FIG. 1, the decode stage 10 may include circuitry (in the form of a register or otherwise) having a plurality of bits that identify a register, and a second plurality of bits that identify a processor mode of operation. Alternatively, although not specifically illustrated, a second grouping of bits may be provided to identify a register bank (instead of a processor mode), for processors that have registers organized in groups or banks. In the illustrated embodiment, there are four signal lines 14 that operate as register-select signal lines, and five signal lines 15 that identify a mode of operation. Collectively, these make up nine signal lines (e.g., 12) that uniquely identify a processor register. The embodiment of FIG. 1 illustrates a processor having thirty-two physical registers, with only sixteen registers available at a given time.

In the embodiment illustrated in FIG. 1, there are six groups of signal lines 11 generated by the decode stage 10. Of course, there may be additional, or fewer, such groups of such signal lines. Each such group (e.g., 12 and 13) uniquely identifies a particular register. In the illustrated embodiment, four groups of these signal lines (e.g., 12) identify source registers, while two groups (e.g., 13) identify destination or target registers. The numbers of these groupings is, of course, processor dependent. Thus, in the embodiment illustrated in FIG. 1, certain instructions may implicate up to four source registers and two destination registers. Of course, for any given instruction, fewer than six registers may be implicated. In connection with instructions such as those implicating fewer than six registers, certain groups of the signal lines will simply be ignored by downstream stages of the processor pipeline.

Thus, the decode stage 10 operates to decode an instruction. In connection with this decode operation, source and destination registers are uniquely identified by a plurality of signal lines. In the illustrated embodiment, nine signal lines are used to uniquely identify each register in the embodiment of FIG. 1. These, or similar signal lines, are passed between each stage of the processor pipeline to identify processor registers as needed at each stage of the pipeline. Similar signal lines 70 are fed back from each downstream stage of the pipeline to the read stage 20, to accommodate data forwarding. As is known, data forwarding is a technique used to ensure that proper values are placed in processor registers. For example, if a processor instruction calls for the storage of a value of a given register to a certain memory location, and the value of that register has been changed by an immediately preceding instruction (but not yet written back to the register file), then the read stage of the pipeline 20 should read into the identified register the value from the downstream pipeline stage having the current value of that register, as opposed to reading the value of that register from the register file. In this regard, and as is known, the register file (not specifically illustrated in FIG. 1) is not updated until the register write stage 60. Prior to this time, if the read stage 20 of the pipeline requires a register value that exists in one of the intermediate pipeline stages 30, 40, 50, or 60, then the value should be read from that intermediate pipeline stage, and is so read through data forwarding lines 70.

In this regard, and as illustrated, the read stage 20 includes compare logic 22 for comparing the nine signal lines for identifying a register output from the decode stage 10 with comparable signal lines within the data forwarding path 70. If there is a match (indicating that the same register has been implicated and its current value is in a downstream stage of the pipeline), then data is read into that register (at the read stage 20) by a data forwarding path 70. If, however, no such register match is identified, then the value associated with the identified register is read in from the register file.

Unfortunately, the pipelined architecture illustrated in FIG. 1 is, in some respects, extremely complex and logic intensive. Specifically, comparisons for purposes accommodating data forwarding are cumbersome and complex. In a processor, for example, having only sixteen registers available or accessible at a given time, the comparisons required among the nine signal lines that uniquely identify a given register are excessively complex. This comparison 25 is carried out in any of a variety of manners. One way of carrying out this comparison is simply to do a straight comparison of all nine bits. When there is an exact match, then the associated register is identified as having an intermediate value in a downstream pipeline stage. The logic, however, required to perform nine-bit comparisons is significant. Another way in which this comparison may be performed is by comparing the four bits 14 that identify the register within a given bank or mode of operation. If and when there is a match on these four bits, then a second level comparison may be made of the five bits 15 that identify the register bank or processor mode of operation. Again, unfortunately, this requires excess logic and levels of complication in carrying out the comparison.

Accordingly, it is desired to provide an improved architecture for accessing processor registers and implementing data forwarding.

SUMMARY OF THE INVENTION

Certain objects, advantages and novel features of the invention will be set forth in part in the description that follows and in part. will become apparent to those skilled in the art upon examination of the following or may be learned with the practice of the invention. The objects and advantages of the invention may be realized and obtained by means of the instrumentalities and combinations particularly pointed out in the appended claims.

To achieve certain advantages and novel features, the present invention is generally directed to an apparatus and method for accessing registers within a processor. In accordance with one embodiment, an apparatus and method are provided for a processor in which at least two separate indicia (such as register select lines, register bank identifiers, processor mode identifiers, etc.) are utilized to uniquely identify and access a processor register. In accordance with this embodiment, bit lines of the separate indicia are encoded into a single, mapped set of signal lines, and these encoded signal lines are used to access the register.

In one particular embodiment, a method is provided for individually accessing any of w total registers in a processor. The method encodes a mode value carried on a plurality n of mode-identifying bits with a register value carried on a plurality m of register-select bits to produce a mapped value carried on a plurality p of bits, wherein p is less than the sum of n+m. The method then uses the encoded plurality of bits to uniquely access any of the w registers.

DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION

Figure 1:
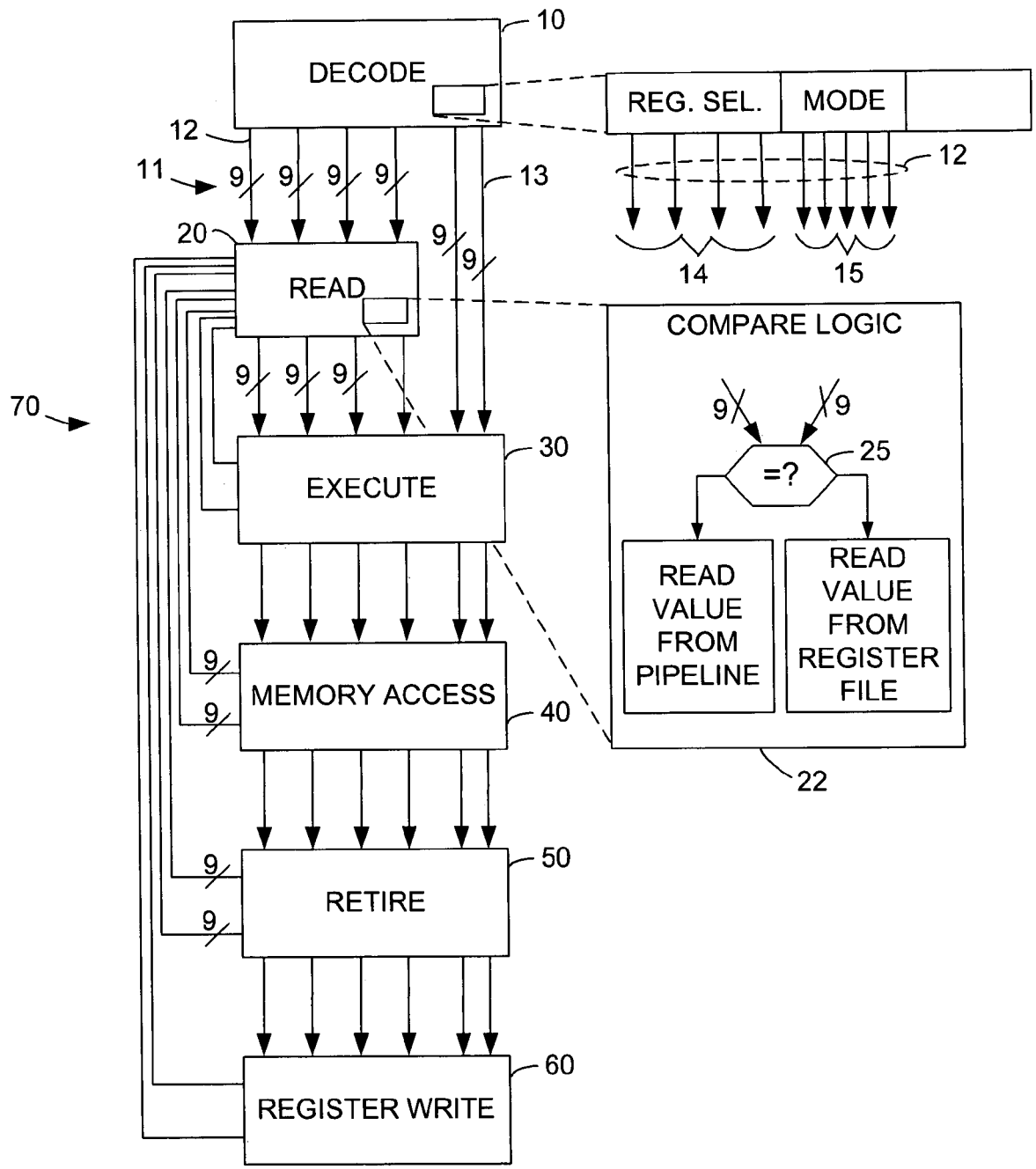
FIG. 1 is a block diagram illustrating certain processing stages within a pipelined processor, as is known in the prior art.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

It is noted that the drawings presented herein have been provided to illustrate certain features and aspects of embodiments of the invention. It will be appreciated from the description provided herein that a variety of alternative embodiments and implementations may be realized, consistent with the scope and spirit of the present invention.

Figure 2:
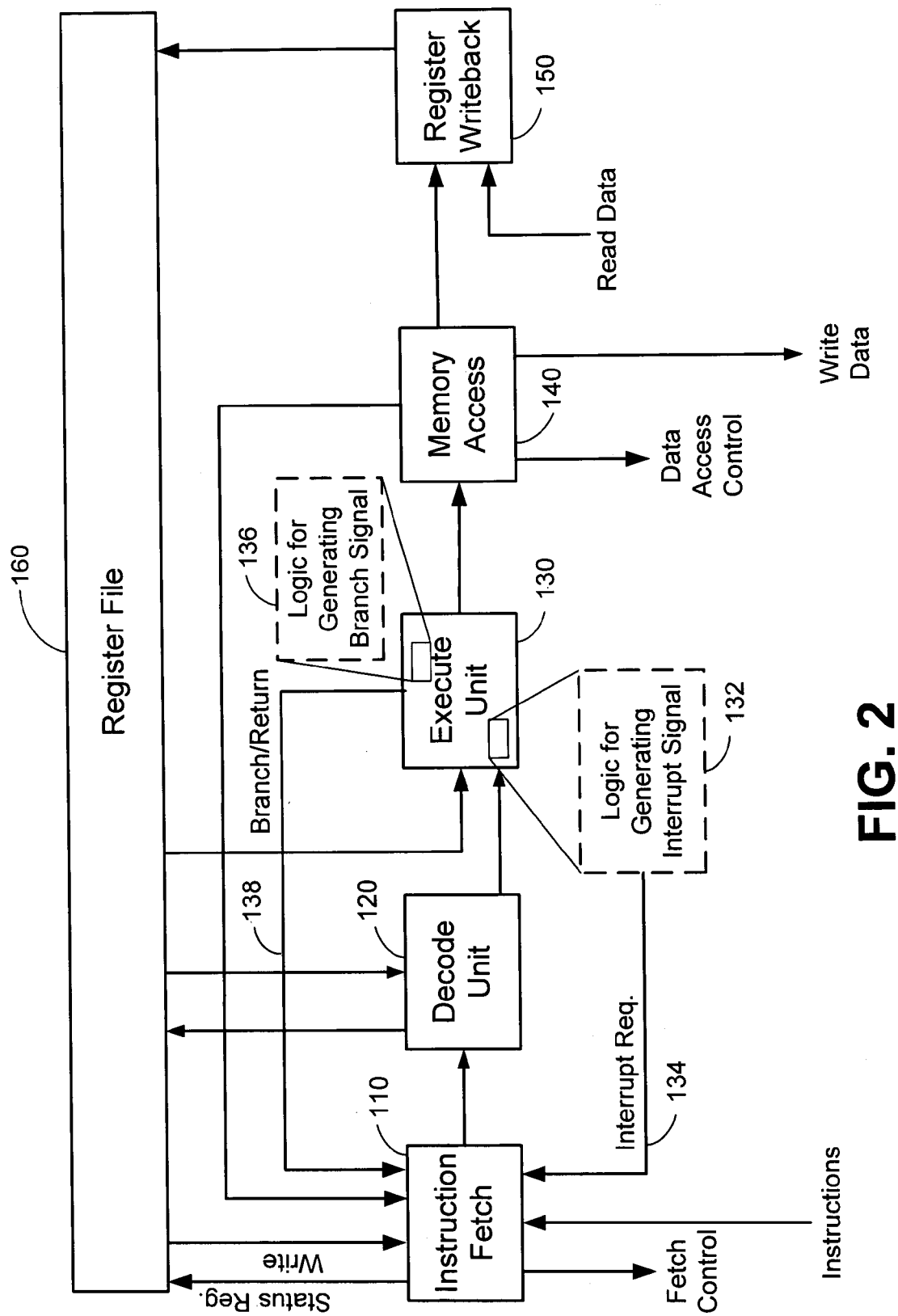
FIG. 2 is a block diagram of a five-stage pipelined processor architecture.

Referring to FIG. 2, a block diagram depicts a five stage pipeline processor architecture for executing instructions. Alternative pipeline architectures, having more or fewer pipeline stages, may be implemented consistent with concepts and teachings of the present invention. In the architecture of FIG. 2, illustrated are an instruction fetch unit 110, a decode unit 120, an execute unit 130, a memory access unit 140, and a register writeback unit 150. Except as otherwise described herein, the operation of these units (or logic blocks) is conventional, known by persons skilled in the art, and need not be further described herein.

As is known, an instruction fetch unit 110 performs instruction memory fetches. This unit is configured to determine the value or contents of a program counter, (within the register file 160) for in-order instruction execution, as well as exception vectors, branches, and returns. The instruction fetch unit 110 is also configured to determine the return address for all exceptions and branch-link instructions, and write or store that return address into an appropriate register within the register file 160. Consistent with the invention, addressing of instruction fetches may be through physical addresses directly to memory, or through an instruction cache (not shown) using physical or virtual addresses. Although the internal architecture of the register file 160 is not shown, the register file 160 includes various registers utilized by the processor. As is known, such registers may include general-purpose registers or special-purpose registers (such as status registers, a program counter, etc.). Further, the registers within the register file 160 may be banked or unbanked. As is known, an unbanked register refers to a single physical register that is available in all processor modes of operation. Typically, unbanked registers are completely general-purpose, having no special uses implied by the architecture. Of course, it would be up to the programmer to ensure that the contents of these registers are saved (e.g., pushed to a stack) when changing modes of operation (or when processing branch routines or other subroutines), and restored when returning from a changed mode of operation. In contrast, banked registers are separate, but essentially configured in a parallel fashion, such that only one register (within a bank) is available in a given mode of operation. A common example of bank registers includes registers available for fast interrupt exception handling. Providing a set of banked registers for this purpose avoids the need to expend the time to save and restore register state for those registers. Instead, upon the invocation of a fast interrupt handling routine, the banked registers for that mode may be immediately accessed and utilized, while the original register contents are preserved.

The decode unit 120 operates to decode instructions passed to it from the instruction fetch unit 110 and generate the necessary control signals for the execute unit 130 to carry out the execution of the particular instruction. The specific architecture of decode units (like decode unit 120) are processor dependent, but the operation and organization of such will be understood by persons skilled in the art. Likewise, the structure and operation of the execute unit 130 are processor dependent, but will be understood by persons skilled in the art. Generally, an execute unit includes circuitry to carry out the execution of instructions as determined by the control signals generated from the decode unit 120.

As illustrated in FIG. 2, the execute unit 130 of the illustrated embodiment may include logic 132 for generating one or more interrupt signals 134, as well as logic 136 for generating one or more branch signals 138. As the names imply, the interrupt signal 134 indicates an interrupt condition (e.g., IRQ, FIRQ, etc.). Likewise, the branch signal 138 indicates a branch condition (or may also indicate a return from a branch). Indirectly, these signals indicate ensuing out-of-order instructions.

The memory access unit 140 interfaces with external data memory for reading and writing data in response to the instruction being executed by the execute unit 130. Of course, not all instructions require memory accesses, but for those that do, the memory access unit 140 carries out the requisite access to external memory. Consistent with the invention, such memory access may be direct, or may be made through a data cache using either physical or virtual addressing.

Finally, the register writeback unit 150 is responsible for storing or writing contents (resulting from instruction execution), where appropriate, into registers within the register file 160. For example, consider the execution of an instruction that adds the contents of two general-purpose registers and stores the contents of that addition into a third general-purpose register. After execution of such an instruction, the register writeback unit 150 causes the value obtained in the summation to be written into the third general-purpose register.

Again, it should be appreciated that the present invention, as described herein, may be implemented in a wide variety of pipelined processor architectures, and the architecture illustrated in FIG. 2 is intended to serve only as an illustrative architecture. Consequently, the illustration of FIG. 2 should not be deemed as limiting upon the architecture or environment of the present invention.

Figure 3:
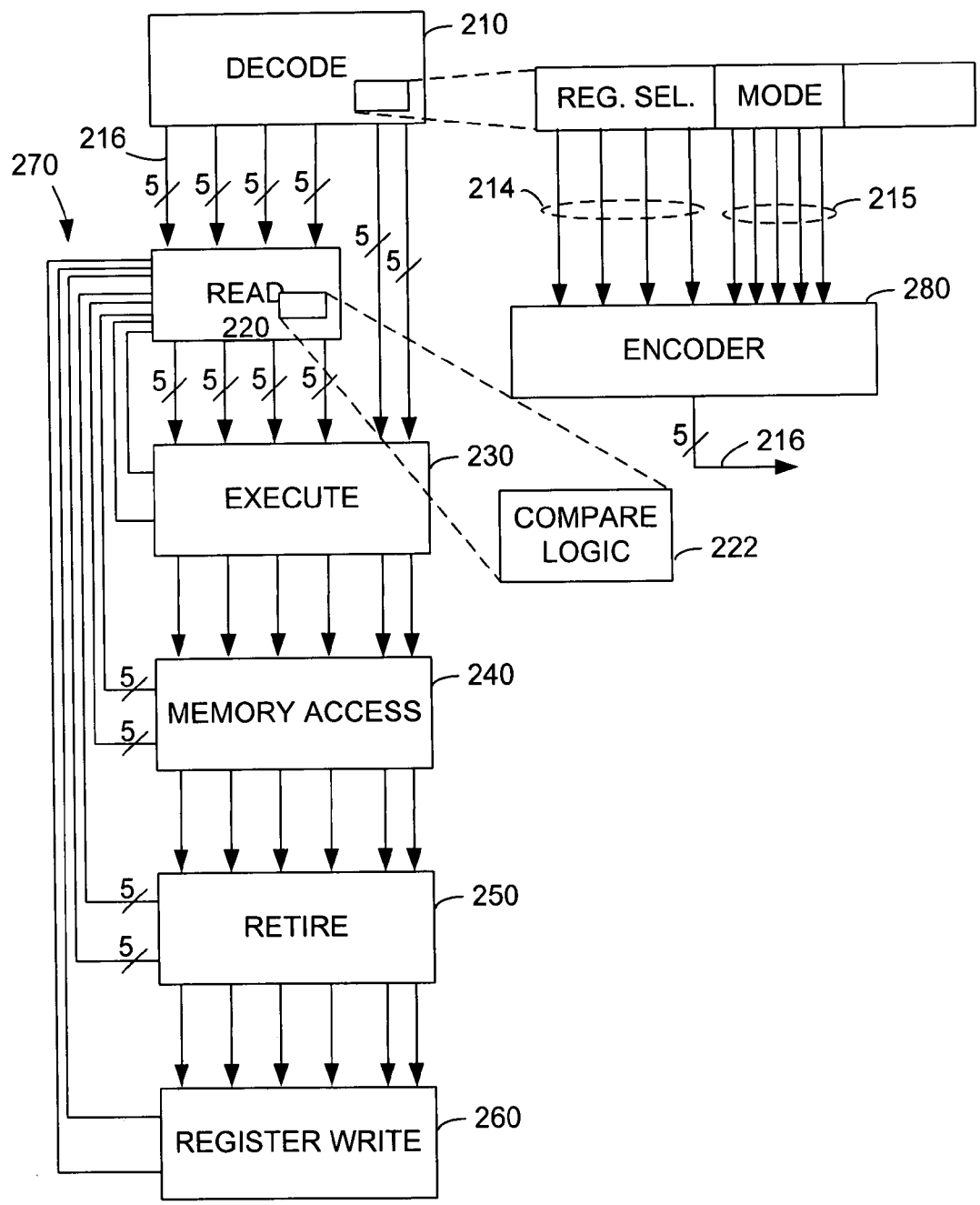
FIG. 3 is a block diagram illustrating stages in a pipelined processor similar to FIG. 1, constructed in accordance with an embodiment of the invention.

Reference is now made to FIG. 3, which is a diagram similar to FIG. 1, but illustrating an improvement thereof realized by an embodiment of the present invention. In this regard, an embodiment of the present invention includes an encoder 280 that operates to encode a plurality of register-identifying bits into a smaller number of bits. In the embodiment illustrated in FIG. 3, nine bits are encoded into five bits. Of course, consistent with the scope and spirit of the present invention, differing degrees of encoding and differing number of bits may be realized. In the illustrated embodiment, the processor has a total of thirty-two internal registers, sixteen of which are accessible at any given time (e.g., during any given mode of operation or in connection with any given instruction). As illustrated in connection with the prior art of FIG. 1, four bits 214 are used as register-select bits, to identify the particular register accessible during a given mode of operation, and five bits 215 are used to identify the processor mode. It is recognized that thirty-two total registers may be uniquely identified with five bits (i.e., $2^5=32$). Therefore, an encoding of bits is performed to map each of the thirty-two processor registers into a register file, such that each register is uniquely identified by the five encoded bits 216. Only one encoder 280 is illustrated in FIG. 3. However, in one implementation, a separate encoder may be provided for each of the six sets of signal lines used for identifying the source and destination registers.

It should also be appreciated and understood that more or fewer sets or groups of signal lines may be provided, consistent with the present invention. In this regard, and as mentioned above, the number of groupings of signal lines for identifying registers is dependent upon the instruction set implemented by the processor architecture. The architecture of the illustrated embodiment supports instructions that implicate as many as four source registers and two target or destination registers. After performing the encoding by the encoder 280, each processor register may be uniquely identified by the five encoded bits throughout all stages of the processor pipeline 220, 230, 240, 250, and 260. Consequently, the incorporation of the encoder 280 realizes several distinct and significant advantages over systems of the prior art. First, such a system provides easier access to the processor registers by reducing the number of bits required to identify a given register. In this regard, it simplifies logic that would otherwise compare nine bits in order to access a register, or the logic that would implement a two-stage comparison (first comparing the register-select bits, and then comparing the bank or operational mode bits). Another advantage realized by the present invention is a significant reduction in data forwarding complexity, timing, and power. As previously described, commensurate prior art systems performed a nine-way comparison (comparing all nine bits) or performed a two-stage comparison in the compare logic of the read stage. The compare logic 222 of the read stage of the embodiment of FIG. 3 is greatly simplified by requiring a comparison of only five bits instead of nine, which significantly simplifies the data forwarding and comparison logic. Further, as illustrated by the data forwarding paths 270, the encoding of the register identification signals significantly reduces the number of bits and signal lines passed throughout the processor pipeline, which reduces logic and power consumed by the processor. Since the enhancement of the present invention is preferably embodied in the decode stage 210 using encoder 280 (or commensurate logic), details regarding circuitry or logic for implementing data forwarding and other aspects and features that are known in the art need not be described herein.

Figure 4:
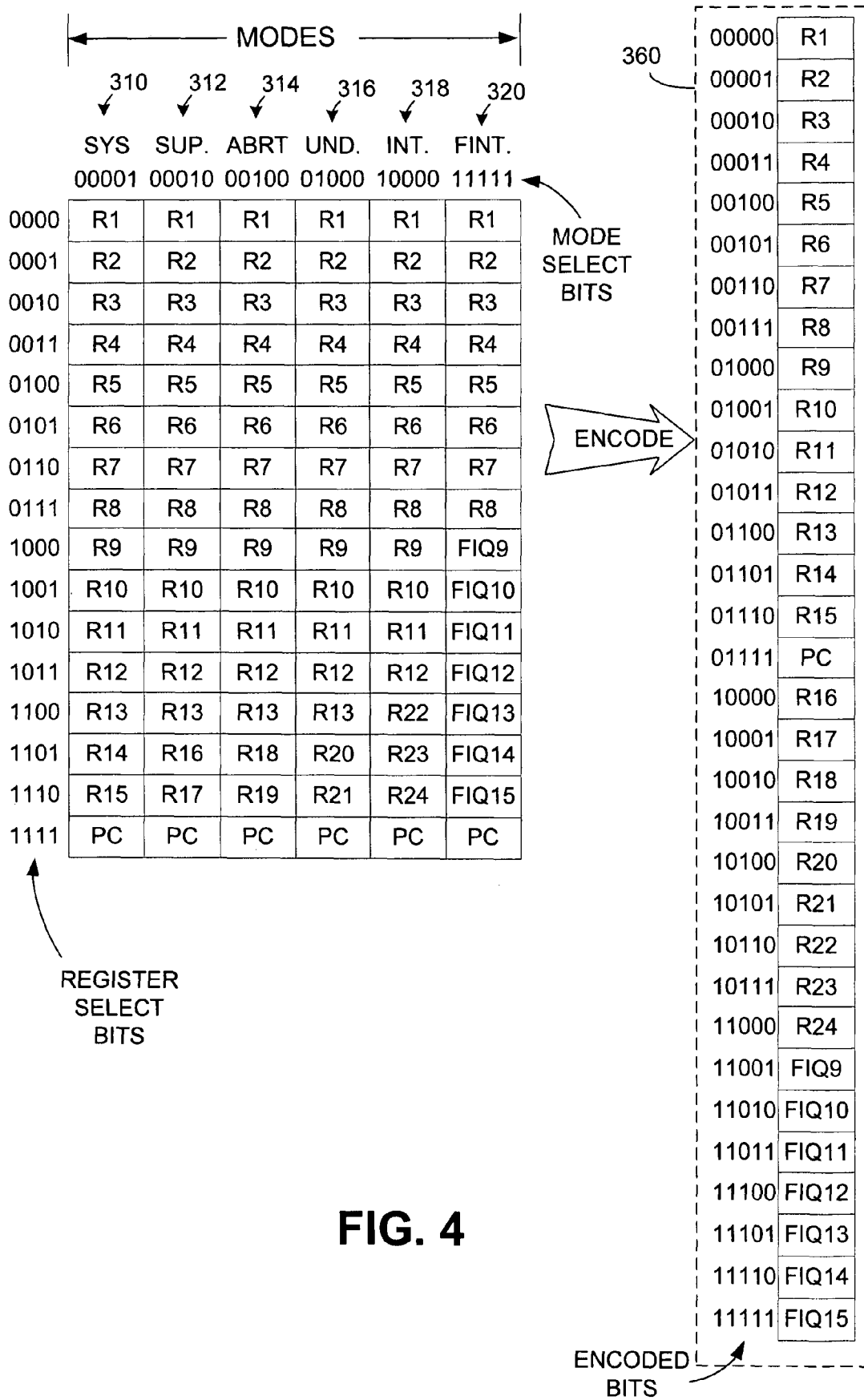
FIG. 4 is a diagram illustrating the mapping of a plurality of registers available in a plurality of processor modes into a register file.

Reference is now made to FIG. 4, which is a diagram illustrating the mapping and encoding of registers in accordance with one embodiment of the invention. In this embodiment, up to sixteen registers may be accessed at any given time, and are identified through register-select bits. As illustrated, there are four such register-select bits that determine the register accessed or selected in any given mode of operation. As illustrated by the table, in the illustrated embodiment there are six modes of operation. These include a system mode 310, a supervisory mode 312, an abort mode 314, an undefined mode 316, an interrupt mode 318, and a fast interrupt mode 320. Processors having similar register configurations are known.

For example, one existing processor architecture in which the present invention could be readily implemented is known as the ARM architecture, which is a 16/32-bit embedded RISC processor. Significant information is publicly available about the structure and operation of the ARM architecture, including, for example, the ARM "Architecture Reference Manual", Second Edition, by David Seal, Addison-Wesley Publisher, 1996–2000. As is known, the ARM processor has a total of 37 registers, of which 31 are general-purpose registers, including a program counter. In addition, there are six status registers, and the processor is configured to operate in different operational modes. The register/mode table on the left-hand side of FIG. 4 closely resembles the structure of the ARM processor. Accordingly, reference may be made to publicly available information on the ARM processor to gain a better understanding of the architecture of the illustrated embodiment of FIG. 4.

As illustrated in the table on the left side of FIG. 4, each unique register is identified by a unique register label. As illustrated, registers R1 through R8 are available in all modes of operation. However, in the fast interrupt mode 320, a set of registers FIQ9 through FIQ15 are available. As illustrated by the table, these registers are not available in any other mode of operation. Therefore, when the processor responds to a fast interrupt, these registers may be presumed to be immediately available, without having to first save their state (e.g., push values onto a stack). A program counter register (PC) is also available in all modes of operation. As can be readily identified from the register labels provided in the table of FIG. 4, there are thirty-two unique registers.

As is further illustrated in FIG. 4, the processor mode of operation is identified by mode-select bits. In the illustrated embodiment, five bits are used to identify the mode of operation. The system mode may be identified by mode-select bits having value 00001, while the supervisory mode of operation 312 may be identified by mode-select bits having value 00010. Other operational modes may be identified by the mode-select bits, as illustrated in the drawing. To illustrate how certain registers may be identified, in accordance with prior art techniques, register FIQ9 is identified by register-select bits having a value 1000 and mode-select bits having value 11111. Likewise, register 13 in the supervisory mode is identified by register-select bits 1100 and mode-select bits of 00010.

In accordance with the invention, the individual registers are uniquely mapped into a register file 360. Since there are thirty-two unique and individual registers, the register identification may be encoded into five bits (since $2^5=32$). Consistent with the invention, any of a variety of unique mappings or orderings of the registers within the register file may be implemented, and the organization or mapping illustrated in FIG. 4 is merely one embodiment. As mentioned above, in a prior art processor, the FIQ9 register would have been identified with register-select bits of 1000 and mode-select bits of 11111. The mapped FIQ9 register, however, of FIG. 4 may be uniquely identified by encoded bits having a value 11001.

Since certain registers are available in various processor modes of operation, it will be up to the programmer to ensure that register values are saved or stored, as necessary or appropriate, when the processor changes between modes. In this regard, the pipelined architecture illustrated in FIG. 3 illustrates the register-identification bits as being passed between the various functional stages. It should be appreciated, however, that bits identifying the current processor mode of operation will also be passed among the various stages of the processor pipeline as appropriate. It should be, appreciated that the concepts and teachings of the present invention are not limited to processors operating in multiple modes. Instead, the broader concepts of the present invention apply to processors having only a subset of registers accessible or available to a given instruction. The subset of registers that are so available may be limited or defined by processor modes of operation or otherwise. One such alternative way of identifying a subset of registers would be to organize the processor registers into banks or groups of registers. In this regard, reference is made to FIG. 5, which is a diagram similar to FIG. 4, but illustrating the organization of processor registers in banks. Specifically illustrated are five banks of registers bank 1 410, bank 2 412, bank 3 414, bank 4 416, and bank 5 418. As in the embodiment of FIG. 4, register-select bits are provided to uniquely identify the registers accessible or available in any given register bank, and register bank bits are provided for uniquely identifying the register bank. As illustrated in the table, register R25, for example, is grouped so that it is accessible in either register bank 3 or register bank 4. When accessed in connection with register bank 3, register R25 is identified by register-select bits 1000 and bank select bits of 00100. Likewise, when accessed in connection with register bank 4, register R25 is identified by register-select bits 1000 and bank select bits of 01000. Register R25, however, is encoded into register file 460 and is uniquely identified by encoded bits 11001. Of course, the organization and layout of registers within a given processor will vary from processor to processor, depending upon the particular needs and design goals of that processor. The present invention is applicable to a wide variety of processor architectures.

Figure 6:
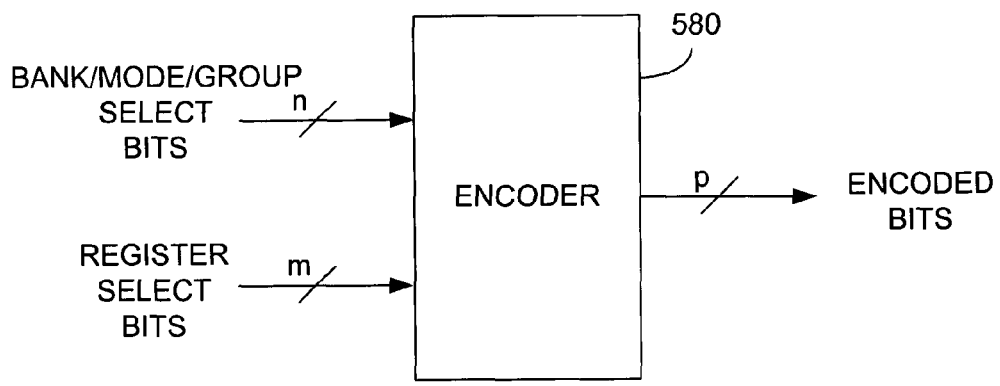
FIG. 6 is a block diagram illustrating an encoder for performing the encoding of processor registers into bits identifying the registers within the mapped register file.

Referring to FIG. 6, a diagram is illustrated showing an encoder 580 constructed in accordance with the present invention. In this regard, the encoder operates to encode a plurality n of bank-selection bits (or mode-selection bits or group-selection bits) with a plurality m of register-select bits to produce a plurality p of encoded bits. In accordance with the invention, the plurality p of the encoded bits is fewer than the sum of the plurality of n+m bits otherwise used to identify a unique register. By reducing the overall number of bits required to uniquely identify and access a register, processor logic, including data forwarding logic, is simplified.

Figure 5:
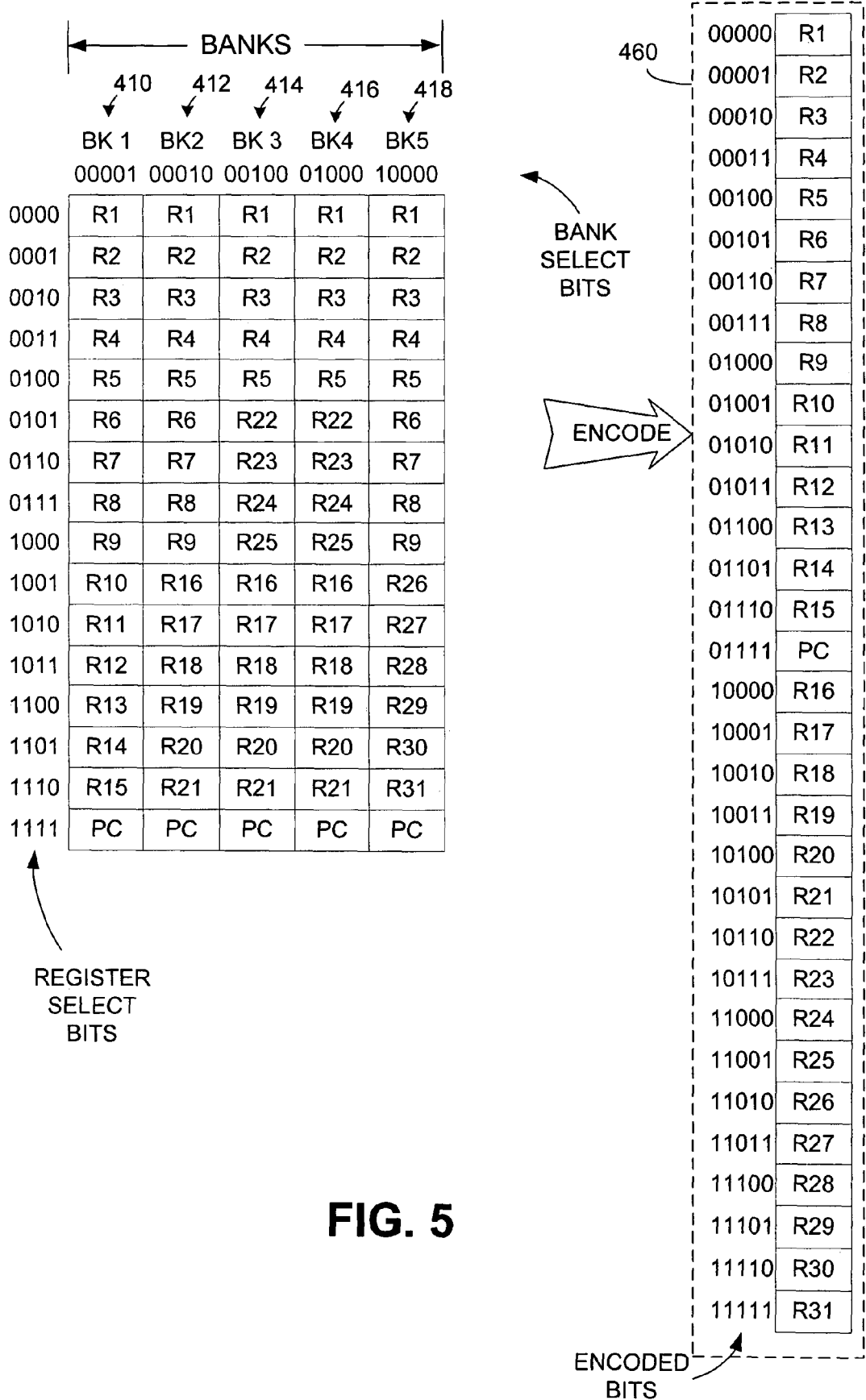
FIG. 5 is a diagram, similar to FIG. 4, illustrating the mapping of a plurality of registers available in a plurality of register banks into a register file.
Figure 7:
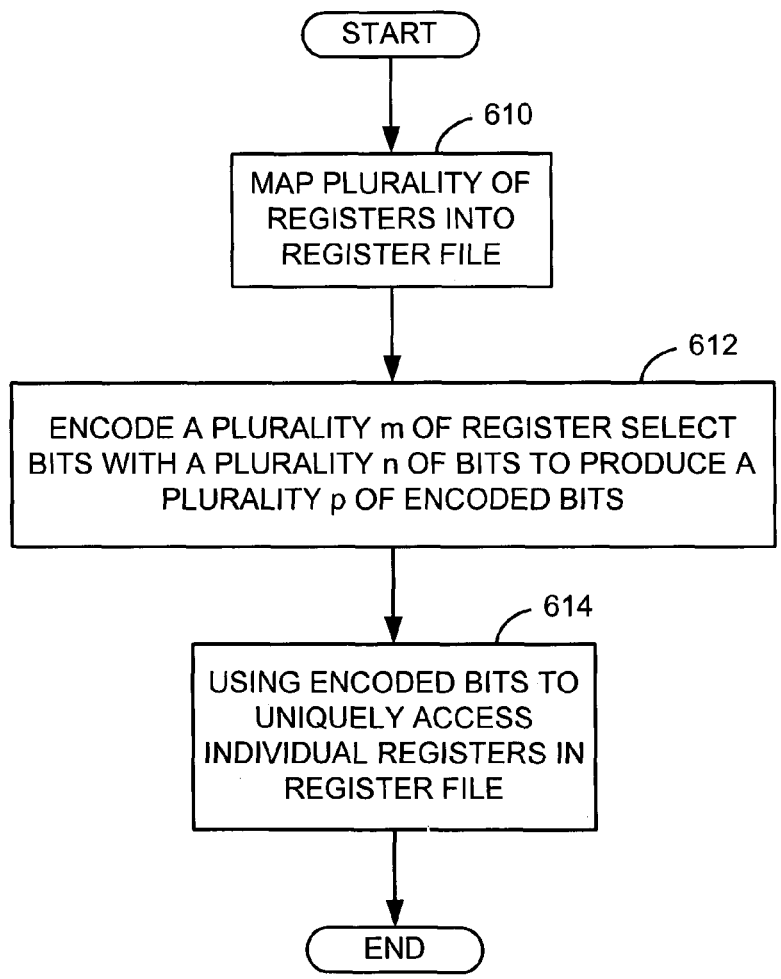
FIG. 7 is a flowchart illustrating the top-level functional operation of an embodiment of the invention.

Reference is now made briefly to FIG. 7, which is a flowchart illustrating the top-level operation of a method of an embodiment of the present invention. In this regard, a method of one embodiment operates to map a plurality of processor registers into a register file (step 610). As illustrated in FIGS. 4 and 5, and discussed herein, the register file will consist of each individual register accessible within the processor.

The method then encodes a plurality m of register-select bits with a plurality n of bits that identify a register bank, group, or processor mode of operation, to produce a plurality p of encoded bits (where p is fewer than the sum of n+m) (Step 612).

Finally, the method uses the encoded bits within the various stages in the processor pipeline, to uniquely access individual registers within the register file (step 614).

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A processor capable of operating in any of a plurality of operating modes, the processor comprising:
    a plurality w of registers, wherein fewer than w registers are program-accessible during any single mode of operation;
    circuitry having n bits capable of carrying a mode value, wherein the mode value identifies a current operating mode of the processor;
    circuitry having m bits capable of carrying a register value, wherein the register value identifies one of the plurality of registers;
    encoder logic configured to encode the mode value with the register value to generate a mapped value carried on p bits, where p is less than m+n, wherein the mapped value collectively identifies both a register and a current processor operating mode.

2. The processor of claim 1, further comprising circuitry for passing the mapped value to different pipelined stages of the processor along with data from a register uniquely identified by the mapped value.

3. The processor of claim 1, further comprising data forwarding logic configured to compare the mapped value output from the encoder logic with at least one mapped value from a subsequent pipeline stage.

4. The processor of claim 3, wherein the data forwarding logic includes logic for reading a data value associated with the mapped value output from the encoder from a register file, responsive to the logic configured to compare, if the mapped value output from the encoder logic does not match with the at least one mapped value from a subsequent pipeline stage.

5. The processor of claim 3, wherein the data forwarding logic includes logic for reading a data value associated with the mapped value output from the encoder from a subsequent pipeline stage, responsive to the logic configured to compare, if the mapped value output from the encoder logic does match with the at least one mapped value from a subsequent pipeline stage.

6. The processor of claim 1, wherein the circuitry having n bits comprises a component selected from the group consisting of: a register, a memory device, and a latch.

7. The processor of claim 1, wherein w is 32, n is five, m is four, and p is five.

8. In a processor capable of operating in a plurality of modes and having w registers, wherein fewer than w registers are program accessible during the execution of a single instruction, a method comprising:
    encoding a mode value carried on a plurality n of mode-identifying bits with a register value carried on a plurality m of register-select bits to produce a mapped value carried on a plurality p of bits, wherein p is less than the sum of n+m, where the mapped value carried on the p bits collectively defines both a current operating mode and register selection; and
    using the encoded plurality of bits to uniquely access any of the w registers.

9. The method of claim 8, further comprising passing the mapped value to different pipelined stages of the processor along with data from a register uniquely identified by the mapped value.

10. The method of claim 8, further comprising comparing the mapped value output from the encoder logic with at least one mapped value from a subsequent pipeline stage.

11. The method of claim 10, wherein the step of comparing further comprises reading a data value associated with the mapped value, if the mapped value output from the encoding step does not match with the at least one mapped value from a subsequent pipeline stage.

12. The method of claim 10, further comprising reading a data value associated with the mapped value output from the encoder from a subsequent pipeline stage, if the mapped value output from the encoder logic does match with the at least one mapped value from a subsequent pipeline stage.

* * * * *